United States Patent
Saxena et al.

(10) Patent No.: US 10,440,599 B2
(45) Date of Patent: Oct. 8, 2019

(54) PROCESSING REQUESTS FOR MEASUREMENT OF SIGNAL QUALITY AT THE LOCATION OF A USER EQUIPMENT WITH MULTIPLE SIMS OR SUBSCRIPTIONS

(71) Applicant: Intel IP Corporation, Santa Clara, CA (US)

(72) Inventors: Alok Saxena, Bangalore (IN); Rishav Dev, Bangalore (IN)

(73) Assignee: Intel IP Corporation, Santa Clara, CA (US)

( * ) Notice: Subject to any disclaimer, the term of this patent is extended or adjusted under 35 U.S.C. 154(b) by 97 days.

(21) Appl. No.: 15/688,910

(22) Filed: Aug. 29, 2017

(65) Prior Publication Data

US 2018/0098238 A1    Apr. 5, 2018

(30) Foreign Application Priority Data

Sep. 30, 2016    (IN) .............................. 201641033551

(51) Int. Cl.
| | | |
|---|---|---|
| *H04W 24/10* | (2009.01) | |
| *H04W 72/04* | (2009.01) | |
| *H04W 72/08* | (2009.01) | |
| *H04W 36/00* | (2009.01) | |
| *H04L 1/00* | (2006.01) | |

(52) U.S. Cl.
CPC ....... *H04W 24/10* (2013.01); *H04W 36/0066* (2013.01); *H04W 72/0453* (2013.01); *H04W 72/085* (2013.01); *H04L 1/0026* (2013.01)

(58) Field of Classification Search
CPC ..... H04W 24/04; H04W 24/08; H04W 24/10; H04W 72/0453; H04W 72/08; H04W 72/085; H04W 72/087; H04L 1/0026
See application file for complete search history.

(56) References Cited

U.S. PATENT DOCUMENTS

| | | | | |
|---|---|---|---|---|
| 10,015,203 | B2 * | 7/2018 | Basavarajappa | .... H04L 65/1016 |
| 10,057,870 | B2 * | 8/2018 | Dev | ........................ H04W 52/00 |
| 10,064,046 | B2 * | 8/2018 | Lipka | ..................... H04W 8/183 |
| 2012/0172011 | A1 * | 7/2012 | Gupta | .................... H04W 68/02 |
| | | | | 455/414.1 |
| 2012/0178500 | A1 * | 7/2012 | Hwang | .................. H04W 8/183 |
| | | | | 455/558 |
| 2013/0029720 | A1 * | 1/2013 | Clevorn | ................ H04L 1/0036 |
| | | | | 455/552.1 |
| 2013/0150013 | A1 * | 6/2013 | Liu | ......... H04W 8/183 |
| | | | | 455/418 |
| 2013/0150036 | A1 * | 6/2013 | Pattaswamy | ........... H04W 8/183 |
| | | | | 455/435.1 |
| 2014/0120859 | A1 * | 5/2014 | Ekici | ....................... H04W 4/90 |
| | | | | 455/404.1 |

(Continued)

*Primary Examiner* — Kevin D Mew
(74) *Attorney, Agent, or Firm* — Viering, Jentschura & Partner MBB (57) ABSTRACT

Methods and apparatus for processing requests for signal quality measurement are provided herein. According to at least one aspect, a multi-subscription user equipment (UE) receives, for a second subscription, a first request to measure signal quality at a location of the UE. The UE checks whether a call is ongoing for a first subscription. The UE sends a response to the first request only if there is no call ongoing for the first subscription.

20 Claims, 7 Drawing Sheets

(56) References Cited

U.S. PATENT DOCUMENTS

| | | | |
|---|---|---|---|
| 2014/0220992 A1* | 8/2014 | Henneberg Rysgaard | H04W 72/048 455/452.1 |
| 2014/0248922 A1* | 9/2014 | Josso | H04W 60/005 455/552.1 |
| 2014/0295831 A1* | 10/2014 | Karra | H04W 68/005 455/434 |
| 2015/0057046 A1* | 2/2015 | Challa | H04W 48/12 455/558 |
| 2015/0230070 A1* | 8/2015 | Kadiyala | H04W 4/16 455/417 |
| 2015/0282057 A1* | 10/2015 | Li | H04B 7/0871 455/552.1 |
| 2015/0311934 A1* | 10/2015 | Jang | H04W 68/005 455/558 |
| 2015/0327159 A1* | 11/2015 | Gude | H04W 48/18 455/434 |
| 2016/0295550 A1* | 10/2016 | Sharma | H04W 4/16 |
| 2017/0150502 A1* | 5/2017 | Chirala | H04W 72/0453 |
| 2018/0184309 A1* | 6/2018 | Bhardwaj | H04W 24/04 |
| 2018/0255450 A1* | 9/2018 | Kumar | H04W 8/18 |

* cited by examiner

FIG. 6 ing to related U.S. applications the present that are being processed in the US Patent Office the present page may be formatted as below:

PROCESSING REQUESTS FOR MEASUREMENT OF SIGNAL QUALITY AT THE LOCATION OF A USER EQUIPMENT WITH MULTIPLE SIMS OR SUBSCRIPTIONS

CROSS-REFERENCE TO RELATED APPLICATIONS

This application claims priority to Indian Patent Application Serial No. 201641033551, which was filed Sep. 30, 2016, and is incorporated herein by reference in its entirety.

BACKGROUND

Technical Field

Aspects of the present disclosure relate generally to user equipment used in wireless telephone networks, and more specifically to processing requests for measurement of signal quality at the location of a user equipment with multiple SIMs.

Related Art

Wireless user equipment (UE), or a wireless device in general, refers to instruments such as mobile phones using which users connect with mobile telephone networks on a wireless medium, as is well known in the relevant arts. In a common scenario, a UE interfaces with an eNodeB of a mobile telephone network providing the corresponding user the facility of voice and data based services.

UEs are provided with subscriber identity modules (SIMs). A SIM typically stores various information such as telephone number of the UE, the international mobile subscriber identity (IMSI) number (also the phone number) used by a service provider to identify and authenticate a subscriber, security keys, temporary information related to the local network, a list of the services provided by the service provider, etc.

A UE (or specific SIM thereon) may receive requests for measurement of signal quality at the location at which the UE is present. In response, the UE may measure the signal quality (e.g., strength of signals received from corresponding eNodeB) on various frequency bands of the cell on which the UE SIM is currently camped. Similar information may be provided with respect to other cells also covering the location of the UE. Such information may be used by the telephone network for purposes such as carrier aggregation (i.e., for sending data simultaneously on multiple channels for enhanced throughput) and hand-over the present call to a more suitable cell/eNodeB.

A single UE may be provided with multiple SIMs, for example, to facilitate the UE to communicate with two different telephone networks (service providers) or even the same telephone network as two different users (e.g., one as an office user and another as a personal user). Aspects of the present disclosure are directed to processing of the above noted measurement requests in such multi-SIM UEs.

BRIEF DESCRIPTION OF THE VIEWS OF DRAWINGS

Example aspects of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A multi-SIM wireless user equipment (UE) receives, on a second SIM, a first request to measure signal quality at a location of the UE. The UE checks whether a call is ongoing on a first SIM. The UE sends a response to the first request only if there is no call ongoing on the first SIM.

Several aspects of the disclosure are described below with reference to examples for illustration. It should be understood that numerous specific details, relationships, and methods are set forth to provide a full understanding of the disclosure. One skilled in the relevant arts, however, will readily recognize that the several features of the present disclosure can be practiced without one or more of the specific details, or with other methods, etc. In other instances, well-known structures or operations are not shown in detail to avoid obscuring the features of the disclosures.

2. Example Environment

Figure 1:
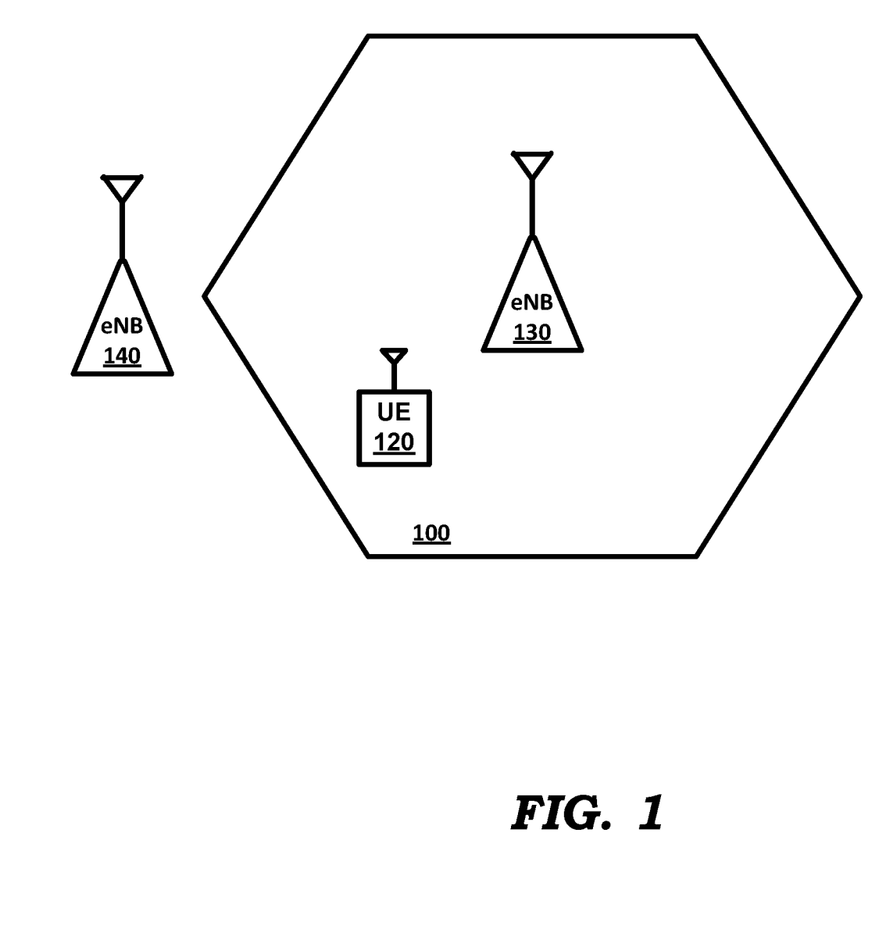
FIG. 1 is a block diagram of an example environment in which several aspects of the present disclosure can be implemented.

FIG. 1 is a block diagram representing an example environment in which several aspects of the present disclosure can be implemented. The example environment is shown containing only representative devices and systems for illustration. However, real world environments may contain more or fewer systems/devices. FIG. 1 is shown containing Evolved NodeBs (eNodeB or eNB) 130 and 140, and user equipment (UE) 120. eNodeB 130 is assumed to have a coverage area represented by cell 100. eNodeB 140 is also associated with a corresponding coverage area, but not shown in FIG. 1. eNodeB 130, eNodeB 140 and UE 120 may operate according to any of well known standards/specifications for wireless mobile communications such as, for example, GSM (Global System for Mobile Communications), LTE (Long Term Evolution), UMTS (Universal Mobile Telecommunications System), CDMA (Code Division Multiple Access), W-CDMA (Wideband CMA), 5G, etc. Further, cell 100 and the devices therein may operate according to frequency division duplex (FDD) and/or time division duplex (TDD) modes specified by LTE also.

Each of eNodeB 130 and eNodeB 140 is a fixed communications unit and provides the last-mile (or last hop) communications link to UEs in the cell. Although not shown in FIG. 1, each of eNodeB 130 and eNodeB 140 may be connected to other devices/systems in the cellular network infrastructure to enable UEs within corresponding coverage ranges to communicate with devices (e.g., other UEs) in other cells, with landline communications equipment in a conventional PSTN, public data networks such as the internet etc., as is well known in the relevant arts. When used in other contexts such 2G and 3G technologies eNodeBs 130 and 140 may be referred to generally as base stations. The term 'base station' as used herein covers base stations as well as eNodeBs. Further, although noted as covering corresponding normal cell areas, each of eNodeB 130 and eNodeB 140 can also be designed to cover a much smaller area such as, for example, a macrocell, microcell or a femtocell. Macro/micro/femtocells are special cellular base stations (operating over smaller cell areas than normal cells) that are often deployed in small areas to add extra cell capacity. For example, such small cells can be deployed temporarily during sporting events and other occasions where a large number of cell phone users are expected to be concentrated in one spot.

UE 120 represents a wireless device such as a mobile phone, and may be used for wireless communication such as voice calls, data exchange such as web browsing, receiving and sending emails, etc. UE 120 may be equipped with multiple SIMs, each for subscription to a same or corresponding mobile network operator (e.g., AT&T Mobility, Sprint, Verizon, etc.). Thus, for example, UE 120 may be equipped with one SIM for accessing services (voice and data) provided by a first mobile network operator via eNodeB 130, and another SIM for accessing services provided by a second mobile network operator via eNodeB 140. It is noted however that, both the first and second SIMs may designed for accessing services by a same mobile network operator also (via a same eNodeB).

UE 120 may receive requests for measurement of signal quality at the location at which UE 120 is present. As noted above, such measurements may be designed to enable the corresponding mobile network operator to provide higher throughput through carrier aggregation, for purposes of handover of UE 120 from a currently serviced cell to another cell, etc. Thus, for example, UE 120 may receive a measurement request from eNodeB 140 to enable eNodeB 140 to make decisions such as those noted above. The manner in which UE 120 processes such measurement requests is described next with respect to a flowchart.

3. Processing Measurement Requests

Figure 2:
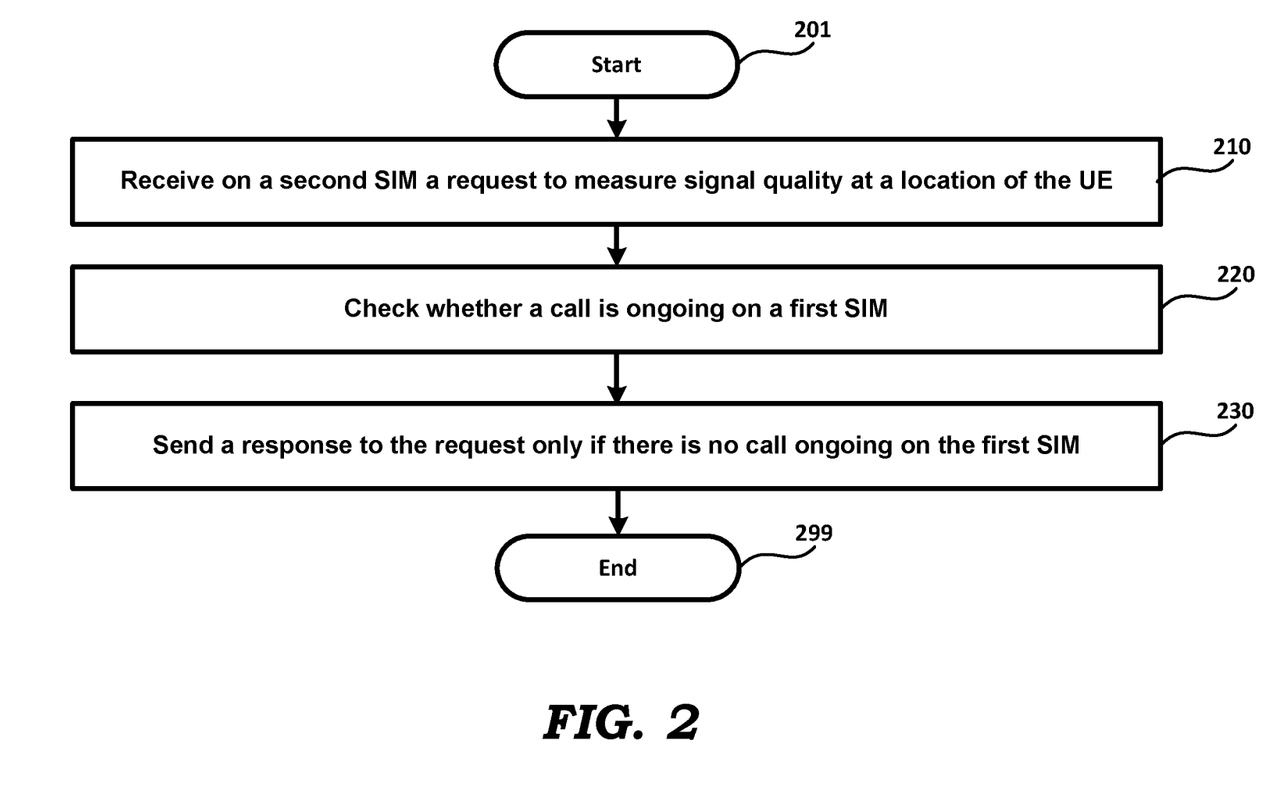
FIG. 2 is a flow-chart illustrating the manner in which measurement requests are processed according to an aspect of the present disclosure.

FIG. 2 is a flowchart illustrating the manner in which measurement requests are processed in a UE according to an aspect of the present disclosure. The flowchart is described with respect to the environment of FIG. 1, and in relation to UE 120, merely for illustration. However, various features described herein can be implemented in other environments and using other components as well, as will be apparent to one skilled in the relevant arts by reading the disclosure provided herein. The flowchart starts in step 201, in which control passes immediately to step 210.

In step 210, UE 120 receives, on a second SIM, a request to measure signal quality at a location of UE 120. The signal whose quality is to be measured can be the carrier signal in corresponding frequency bands allocated for use by the mobile telephone network in the same cell as UE 120 is located currently, and/or carrier signals in neighboring cells. Generally, a higher carrier signal strength implies that the signal quality is good and can be used for reliable communication between UE 120 (using the second SIM) and the corresponding base station that serves the cell. The request can be received as part of an RRC Connection Reconfiguration message on the second SIM. Control then passes to step 220.

In step 220, UE 120 checks whether a call is ongoing on a first SIM. A call would be said to be ongoing if there are signals bearing information are being received and/or transmitted on a corresponding connection (to/from base station) for the subscriber configured on the first SIM. For illustration, it is assumed that the call is a voice call, for which uninterrupted transmission support is generally desirable for a superior user experience. However, features of the present disclosure can be applied to other types of calls for which such disruption is desirable to be avoided. Control then passes to step 230.

In step 230, UE 120 sends a response to the request (of step 210) only if there is no call ongoing on the first SIM. The response is formed by measuring the signal quality (as requested in the request of step 210) and encoding the measured values in a packet forming the response. The packet is transmitted in a known way. Control then passes to step 299, in which the flowchart ends.

Although not shown in FIG. 1, or indicated in the flowchart above, the measurement request of step 210 may also be a request to measure carrier signal quality of one or Access Points (AP) of nearby WLANs (Wireless Local Area Networks) whose AP/Controller are within communication range of UE 120. Such measurements may be requested with the aim of enabling carrier aggregation using APs (which are within communication range of UE 120), solely using such APS, or in addition to other cells.

Thus, when equipped with two SIMs (or in general multiple SIMs), UE 120 is designed to perform measurements and report the results to the requesting base station (i.e., the eNodeB associated with the second SIM) only if no call is ongoing on another SIM. Illustration of the above steps in example situations is provided below. However, the implementation details of UE 120 are first described.

4. User Equipment

Figure 3:
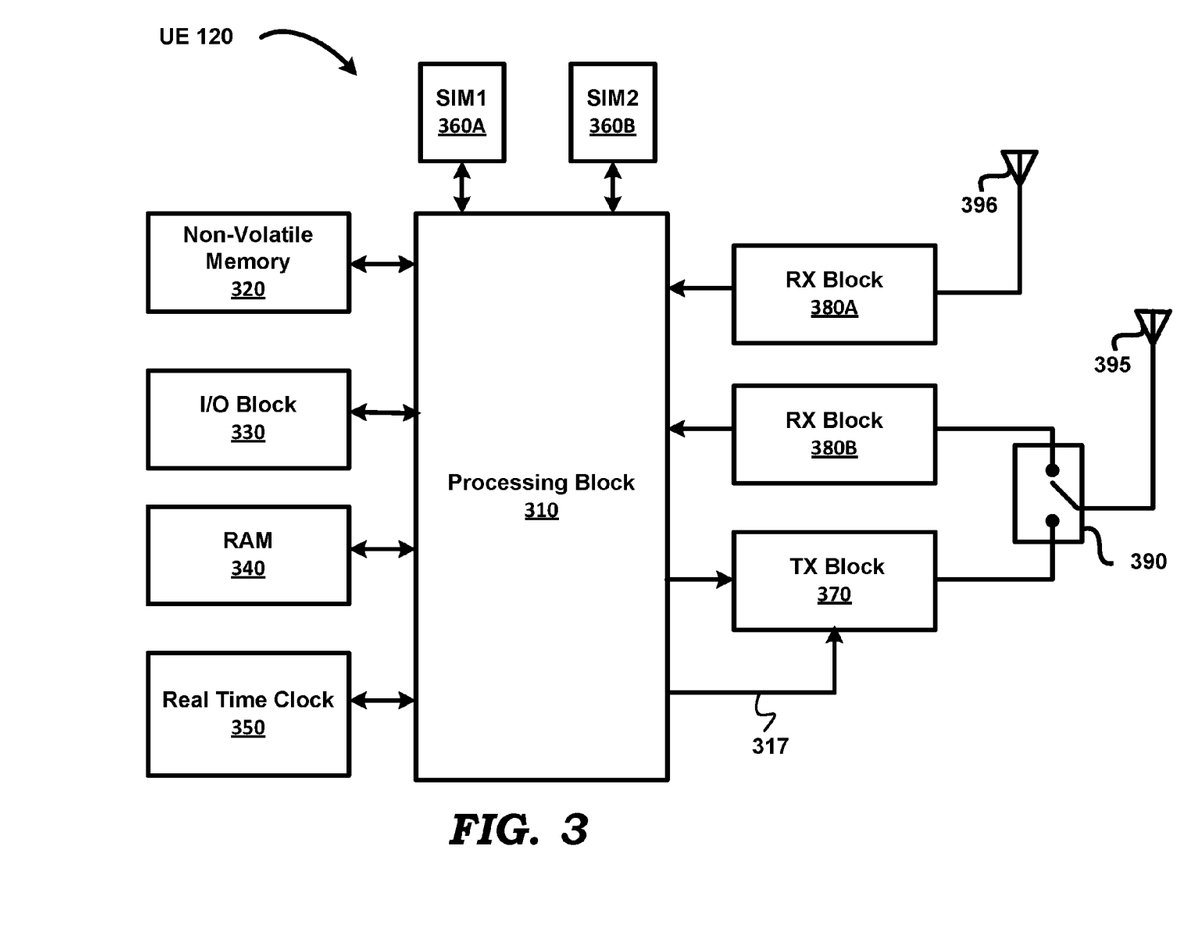
FIG. 3 is a block diagram illustrating the details of a user equipment (UE) according to an aspect of the present disclosure.

FIG. 3 is a block diagram depicting the implementation details of a UE according to an aspect of the present disclosure. UE 120 is shown containing processing block 310, non-volatile memory 320, input/output (I/O) block 330, random access memory (RAM) 340, real-time clock (RTC) 350, SIM1 360A, SIM2 360B, transmit (TX) block 370, receive (RX) blocks 380A and 38B, switch 390, and antennas 395 and 396. Some or all units of UE 120 may be powered by a battery (not shown). UE 120 may alternatively be mains-powered and contains corresponding components such as regulators, filters, etc. The specific blocks of UE 120 are shown by way of illustration only, and UE 120 may contain more or fewer blocks depending on specific requirements.

According to an aspect of the present disclosure, UE 120 corresponds to a mobile phone supporting dual-SIM. The respective SIMs may subscribe to data and voice services according to one of several radio access technologies such as GSM (Global System for Mobile Communication), LTE (Long Term Evolution) (Frequency Division Duplex (FDD)

as well as Time Division Duplex (TDD)), CDMA (Code Division multiple Access), WCDMA (Wideband CDMA), 3G ($3^{rd}$ generation), 5G ($5^{th}$ generation), etc, as also noted above. Further, the two SIMs can be directed to operation with the same type of radio access technology (e.g., LTE on both SIMs), or respectively different radio access technologies (e.g., LTE on one SIM and 3G on the other SIM, LTE on one SIM and CDMA on the other SIM, etc.).

Each of SIM1 360A and SIM2 360B represents a subscriber identity module (SIM) that may be provided by a mobile network operator (also known as a service provider). As is well known in the relevant arts, a SIM may store the international mobile subscriber identity (IMSI) number (which is also the phone number) used by a mobile network operator to identify and authenticate a subscriber. Additionally, a SIM may store address book/telephone numbers of subscribers, security keys, temporary information related to the local network, a list of the services provided by the service provider, etc. Though not shown, the UE is equipped with two holders, each for housing a respective one of the two SIMs 360A and 360B. Typically, the SIM is 'inserted' into such housing before the UE can access the services provided by the network operator for subscriber configured on the SIM.

Processing block 310 may operate to read the IMSI number, security keys etc., in transmitting and receiving voice/data respectively via TX block 370 and the corresponding one of RX block 380A and 380B. It is assumed herein that, SIM1 uses RX block 380A for receiving voice/data and other signals, SIM2 uses RX block 380B for receiving voice/data and other signals, and TX block 370 is shared by SIM1 and SIM2 for transmission of corresponding signals.

RTC 350 operates as a clock, and provides the 'current' time to processing block 310. Additionally, RTC 350 may internally contain one or more timers. I/O block 330 provides interfaces for user interaction with UE 120, and includes input devices and output devices. The input devices may include a keypad and a pointing device (e.g., touchpad). Output devices may include a display with touch-sensitive screen.

Antenna 396 operates to receive from a wireless medium, corresponding wireless signals (representing voice, data, etc.) according to one or more standards such as LTE, and provides the received wireless signals to RX block 380A. Antenna 396 may also be connected via a switch to a transmit block (such as TX block 370 described below), but such blocks and connections are not shown in FIG. 3 in the interest of conciseness.

Antenna 395 operates to receive from, and transmit to, a wireless medium, corresponding wireless signals (representing voice, data, etc.) according to one or more standards such as LTE. Switch 390 may be controlled by processing block 310 (connection not shown) to connect antenna 395 to one of blocks 370 and 380B as desired, depending on whether transmission or reception of wireless signals is required. Switch 390, antenna 395 and the corresponding connections of FIG. 3 are shown merely by way of illustration. Instead of a single antenna 395, separate antennas, one for transmission and another for reception of wireless signals, can also be used. Further, although separate antennas 395 and 396 are shown in FIG. 3, a single antenna can instead be used using appropriate techniques, as would be apparent to one skilled in the relevant arts.

Each of RX blocks 380A and 380B represents a receiver (or receive chain) that receives a corresponding wireless (RF) signal bearing voice/data and/or control information via the corresponding antennas and switches, demodulates the RF signal, and provides the extracted voice/data or control information to processing block 310. RX blocks 380A and 380B each may contain RF circuitry (front-end filter, low-noise amplifier, mixer/down-converter, filters) as well as baseband processing circuitry for demodulating the down-converted signal. Alternatively, RX blocks 380A and 380B may contain only the RF circuitry, with processing block 310 performing the baseband operations in conjunction with the RF circuitry. Data/voice for SIM1 and SIM2 are received via RX blocks 380A and 380B respectively.

TX block 370 (which represents a shared transmit chain) receives, from processing block 310, digital signals representing information (voice, data, acknowledgements to received data, etc.) to be transmitted on a wireless medium (e.g., according to the corresponding standards/specifications), generates a modulated radio frequency (RF) signal (according to the standard), and transmits the RF signal via switch 390 and antenna 395. TX block 370 may contain RF circuitry (mixers/up-converters, local oscillators, filters, power amplifier, etc.) as well as baseband circuitry for modulating a carrier with the baseband information signal.

Alternatively, TX block 370 may contain only the RF circuitry, with processing block 310 performing the modulation and other baseband operations (in conjunction with the RF circuitry). TX block 370 (or the transmit chain in general) may additionally include shared memory resources and software modules used in the transmit operations. In particular, and as described in detail below, TX block 370 is shared between SIM1 and SIM2, and therefore multiplexed by UE 120 for transmitting signals associated with operations by SIM1 and SIM2.

Sharing of TX block 370 (the shared transmit chain) may be achieved by processing block 310 tuning (via control signal in path 317) TX block 370 to the corresponding frequency band (or channel) that is desired for transmitting the respective signal (control signal or data signal). Typically, such tuning involves changing the frequency of the local oscillators and filter pass bands in the transmit chain such that the transmitted signal (at antenna 395) lies in the desired frequency band.

Thus, in the context of LTE FDD for example, for transmitting control/voice/data signals corresponding to SIM1, processing block 310 tunes the transmit chain to cause the transmitted wireless signal to lie in one (desired) frequency band, and for transmitting control/voice/data signals corresponding to SIM2, processing block 310 tunes the transmit chain to cause the transmitted wireless signal to lie in another (desired) frequency band. In the context of LTE TDD, such tuning as noted above may not be required, and processing block 310 may merely assign the transmit chain (without tuning) to the corresponding transmit operations for the respective SIM.

Non-volatile memory 320 is a non-transitory machine readable medium, and stores instructions, which when executed by processing block 310, causes UE 120 to operate as described herein. In particular, the instructions enable UE 120 to operate as described with respect to the flowchart of FIG. 2. The instructions may either be executed directly from non-volatile memory 320 or be copied to RAM 340 for execution.

RAM 340 is a volatile random access memory, and may be used for storing instructions and data. RAM 340 and non-volatile memory 320 (which may be implemented in the form of read-only memory/ROM/Flash, etc.) constitute computer program products or machine (or computer) readable medium, which are means for providing instructions to processing block 310. Processing block 310 may retrieve the instructions, and execute the instructions to provide several features of the present disclosure.

Processing block 310 (or processor in general) may contain multiple processing units internally, with each processing unit potentially being designed for tasks associated with a corresponding SIM. Thus, for example, processing block 310 may be implemented as separate processing cores, one each for each SIM (SIM1 and SIM2). Alternatively, processing block 310 may represent a single processing unit executing multiple execution threads in software, each execution thread handling operations for a respective SIM. In general, processing block 310 executes instructions stored in non-volatile memory 320 or RAM 340 to enable UE 120 to operate according to several aspects of the present disclosure, described in detail herein.

Figure 4:
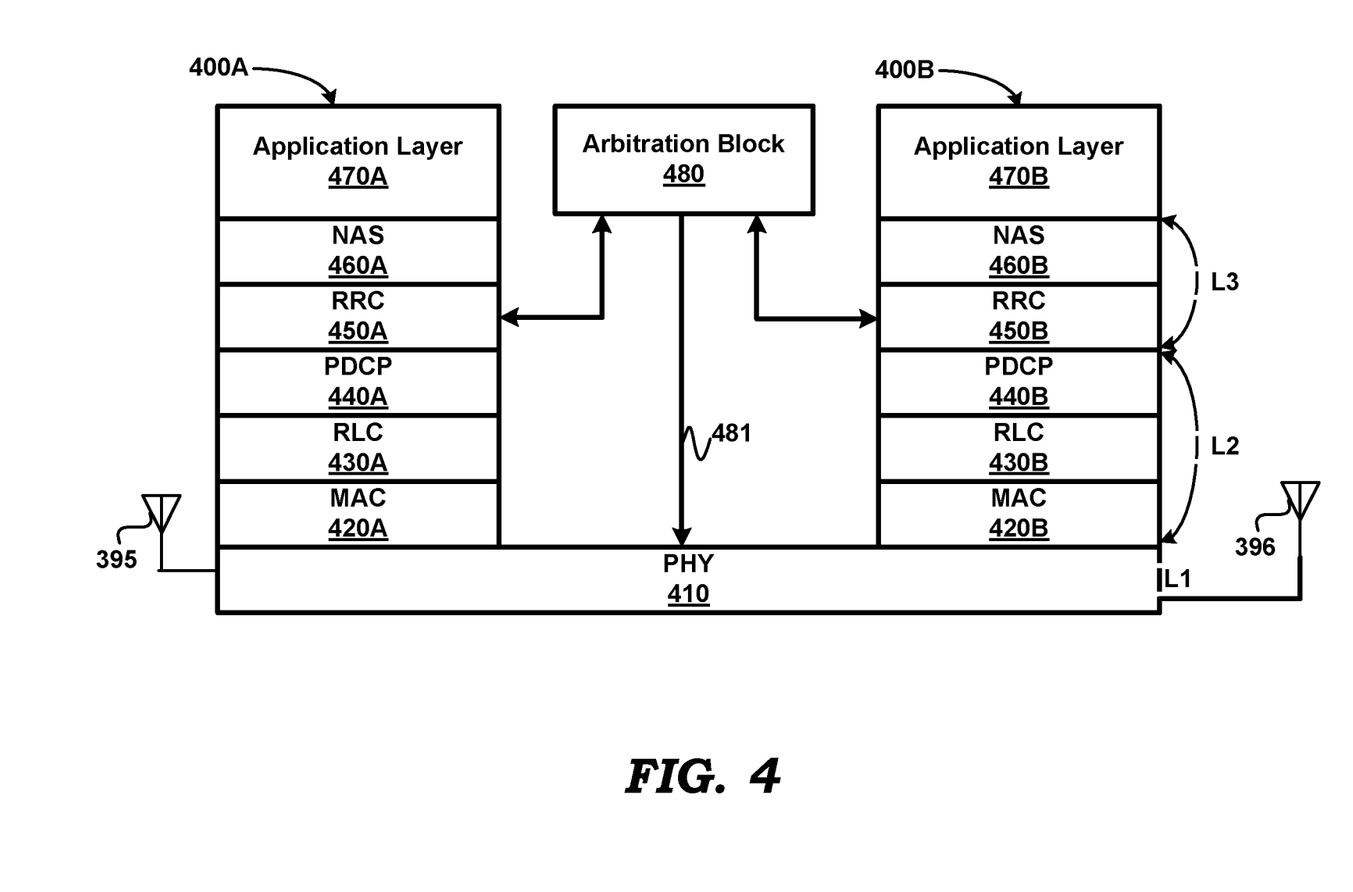
FIG. 4 is a block diagram depicting a protocol stack implemented by a UE according to an aspect of the present disclosure.

FIG. 4 illustrates an alternative view of the implementation of UE 120, and shows example protocol stacks 400A and 400B implemented in UE 120 for handling operations for respective SIMs SIM1 and SIM2. All the protocols of the stack may be realized by appropriate operation of various blocks shown in FIG. 3, as will be apparent to a skilled practitioner based on the disclosure provided herein.

The various layers in the respective stacks may be implemented to generally conform to the ISO OSI (International Standards Organization Open Systems Interconnect) model, and are only briefly described below, since the corresponding implementations of the blocks would be well known to one skilled in the relevant arts on reading the disclosure herein. Further, only the relevant blocks of the protocol stack are shown in FIG. 4, and typically more blocks (such as transport layer etc.) according to the ISO OSI model may be present, as also would be apparent to one skilled in the relevant arts. Although it is assumed herein that UE 120 is implemented to have separate stacks for each of the two SIMs, a single/same protocol stack may also be designed to handle operations for both SIMs. Arbitration block 480 is also shown in FIG. 4.

Protocol stack 400B, which is assumed to handle operations for SIM2 360B, is shown containing layers L1, L2, L3 and the application layer. Layer 1 corresponds to PHY 410, which represents the electrical and physical interface between UE 120 and a transmission medium (here a wireless medium). PHY 410 contains RX block 380A, RX block 380B and TX block 370. The portion of PHY 410 that contains RX block 380A is assumed to be part of protocol stack 400A, while the portion that contains RX block 380B is assumed to be part of protocol stack 400B. The TX block 370 of PHY 410 is deemed to be part of both protocol stacks 400A and 400B. Whether TX block 370 (transmit portion) of PHY 410 operates for transmitting signals corresponding to SIM1 or SIM2 is controlled by arbitration block 480 (such control being effected via path 481, and which corresponds to path 317 of FIG. 3).

The transmit portion of PHY 410 receives data from either MAC 420A or MAC 420B (depending on control from arbitration block 480) and forwards the data to antenna 395 for transmission. RX block 380A-portion of PHY 410 receives data from antenna 395 and forwards the data to MAC 420A for further processing. RX block 380B-portion of PHY 410 receives data from antenna 396 and forwards the data to MAC 420A for further processing.

Layer 2 of protocol stack 400B includes MAC (Medium Access Control layer) 420B, Radio Link Control layer (RLC) 430B and Packet Data Convergence Protocol (PDCP) 440B. MAC 420B performs operations such as mapping between logical channels and transport channels, error correction through HARQ, priority handling between logical channels, etc. RLC 430B performs operations such as error correction through ARQ, concatenation, segmentation and reassembly of RLC SDUs, re-segmentation of RLC data PDUs, duplicate detection, etc. PDCP 440B performs operations such as header compression and decompression, ciphering and deciphering, etc.

Layer 3 of protocol stack 400B includes RRC (Radio Resource Control layer) 450B and NAS (Non-access Stratum protocol) 460B. RRC 450B performs operations such as paging, establishment, maintenance and release of an RRC connection between UE 120 and base station 140 (FIG. 1), security functions including key management, QoS (Quality of Service) management functions, measurement reporting and control of the reporting, etc. RRC 450B maintains data structures representing various operational states (e.g., whether SIM2 is in RRC idle mode or RRC connected mode, whether measurement request has been received from eNodeB 140, whether a VoLTE (Voice over LTE) call is currently underway, etc), some of which are shown and described below with respect to FIG. 6. NAS 460B performs operations such as support of mobility of UE 120, support of session management procedures to establish and maintain IP connectivity between UE 120 and a packet data network gateway, etc.

Application layer 470B represents a communications component that allows software applications executing in UE 120, and associated with SIM2, to communicate with software applications in other nodes (servers, etc.) via the other blocks shown in FIG. 4.

MAC 420A, RLC 430A, PDCP 440A, RRC 450A, NAS 460A and application layer 470A operate similar to MAC 420B, RLC 430B, PDCP 440B, RRC 450B, NAS 460B and application layer 470B described above, but correspond to SIM1. Specifically, RRC 450A maintains data structures representing various operational states (e.g., whether SIM1 is in RRC idle mode or RRC connected mode, whether measurement request has been received from eNodeB 130, whether a VoLTE (Voice over LTE) call is currently underway, etc), some of which are shown and described below with respect to FIG. 6.

Arbitration block 480 (which represents a software module executed by processing block 310) retrieves various state parameters from RRC 450A and RRC 450B, and thus determines the activity state of both SIMs. According to an aspect of the present disclosure, arbitration block 480 allows one SIM (e.g., SIM2) to transmit measurement results (in response to a measurement request) only if there is no call ongoing in the other SIM (e.g., SIM1), as described next with combined reference to FIG. 5 and FIG. 6. Merely for illustration, it is assumed in the description below that each of SIM1 and SIM2 (as well as UE 120) is designed for access to corresponding LTE networks.

5. Example Scenario

According to an aspect of the present disclosure, both SIM1 and SIM2 of UE 120 are designed for accessing LTE services. It is assumed that a paging message is received on SIM2 while a VoLTE (Voice over LTE) call is ongoing on SIM1. The paging message on SIM2 is an indication that there is an incoming VoLTE call or an SMS (Short Messaging Service) on SIM2. The measurement request on SIM2 of UE 120 (as noted in step 210 of the flowchart of FIG. 2) is received at some time instant following the paging message, and is received as part of an RRC Connection Reconfiguration message that encapsulates a measurement request on SIM2. The events of the example scenario, including the exchange of messages between UE 120 and eNodeB 140 and the operation of arbitration block 480, are described below with combined reference to FIGS. 5A-5D and FIG. 6.

FIGS. 5A-5D show the entries of a table 500 containing status of various state parameters for SIM1 and SIM2 retrieved by arbitration block 480 from RRC 450A and RRC 450B, and stored in RAM 340 or non-volatile memory 320. Column C1 lists various state parameters related to call related procedures corresponding to SIM1 and SIM2, and columns C2 and C3 respectively list the corresponding status (Yes or No) for SIM1 and SIM2. Row R1 contains the status of whether a paging message has been received. Row R2 contains the status of whether an RRC connection has been established. Row R3 contains the status of whether a default radio bearer connection has been established. Row R4 contains the status of whether an RRC connection reconfiguration message has been received (with the message containing a measurement request) from the corresponding base station. Row R5 contains the status of whether a VoLTE call is ongoing currently.

Figure 5A:
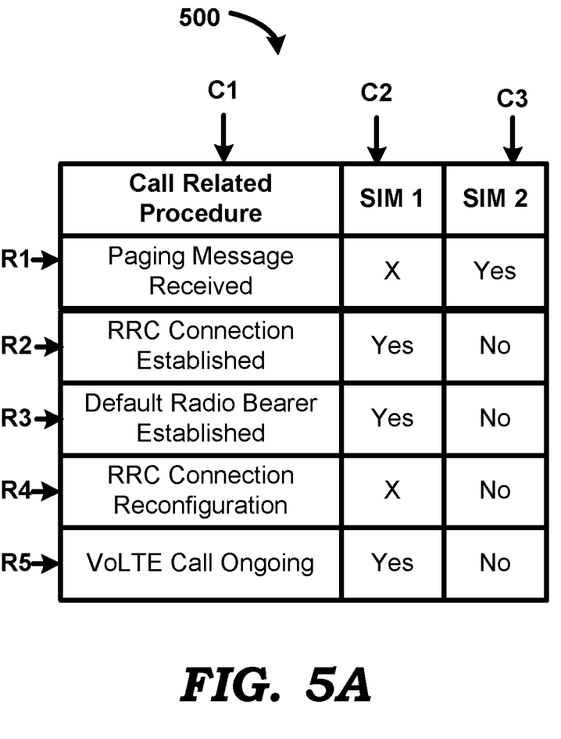
FIGS. 5A-5D depict entries in a table at respective time instances, representing the data structures maintained and examined by a UE in processing the measurement requests, according to an aspect of the present disclosure.

In FIG. 5A, the entries in rows R2, R3 and R5 corresponding to SIM1 are all shown as 'Yes', reflecting the situation that a VoLTE call is currently ongoing in SIM1. The entries corresponding to row R1 and R4 for SIM1 are shown with an 'X', indicating that these are 'don't care conditions, and the entries could be either Yes or No.

Figure 6:
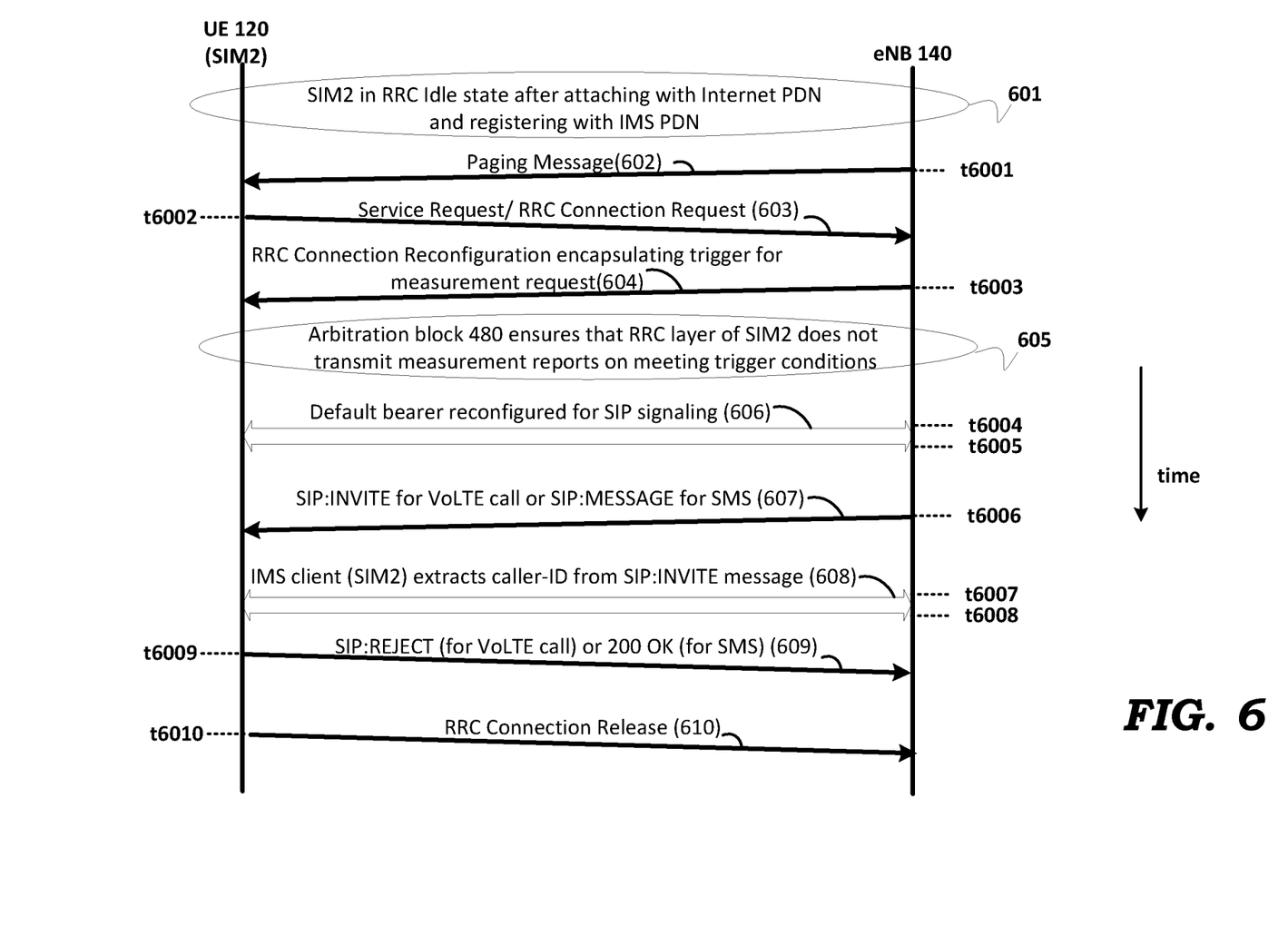
FIG. 6 is a timing diagram depicting the processing of a call setup request, including a measurement request, received on a second SIM when a VoLTE call is ongoing on a first SIM, according to an aspect of the present disclosure.

FIG. 6 is a message sequence diagram illustrating the sequence of messages that are exchanged between UE 120 and eNodeB 140. For illustration, it is assumed that a call is ongoing on SIM1 at least in the duration t6001 to t6010. Prior to time instant t6001, SIM2 of UE 120 is in an RRC Idle state after attaching with internet packet data network (PDN) and registering with IMS (IP Multimedia Subsystem) PDN via eNodeB 140 (601). RRC Idle state indicates that SIM2 is not connected to eNodeB 140 (no radio link), although eNodeB 140 (or the corresponding mobile network) knows that the SIM2 od UE 120 is present on the network and is able to reach it in case of an incoming call or SMS.

At time instant t6001, SIM2 receives a paging message (602) from eNodeB 140. RRC 450B stores a state variable to reflect such condition (Yes), and the status retrieved by arbitration block 480 and stored in table 500 (as shown in FIG. 5A) is accordingly indicated as 'Yes' in row R1/column C3.

Figure 5B:
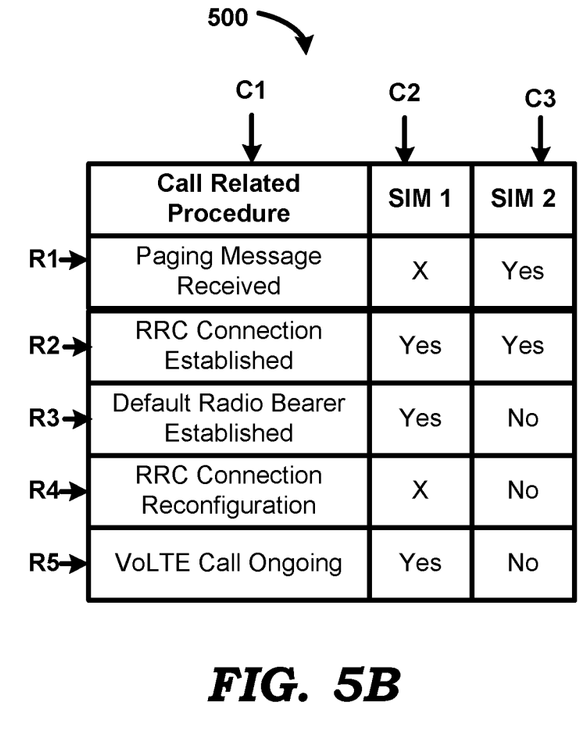

In response to receipt of paging message 602, and at t6002, UE 120 transmits, on SIM2, a service request/RRC connection request (603) to eNodeB 140. Service request is generally generated by NAS 460B and may be piggy-backed on the RRC connection request generated by RRC 450B. An RRC connection is then established between UE 120 (SIM2) and eNodeB 140. Although not shown in FIG. 6, the RRC connection may entail exchange of 'RRC connection setup' message and 'RRC connection setup complete message' between UE 120 and eNodeB 140. Once the RRC connection is thus setup, RRC 450B stores a state variable to reflect RRC connection established condition as 'Yes', and the status retrieved by arbitration block 480 and stored in table 500 (as shown in FIG. 5B) is accordingly indicated as 'Yes' in row R2/column C3.

Figure 5C:
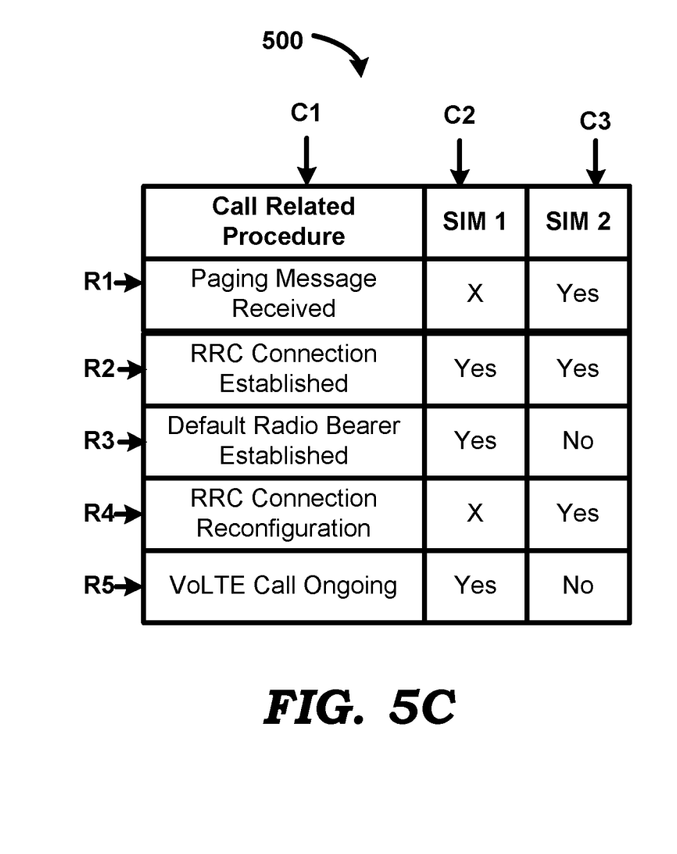

At t6003, eNodeB 140 transmits an RRC connection reconfiguration message (604) to UE 120, with the message encapsulating a trigger for measurement request. The RRC connection reconfiguration message (604) is a command from eNodeB 140 to modify the RRC connection established following the establishment of an RRC connection between SIM2 and eNodeB 140. RRC 450B stores a state variable to reflect 'RRC connection reconfiguration message received' as 'Yes', and the status retrieved by arbitration block 480 and stored in table 500 (as shown in FIG. 5C) is accordingly indicated as 'Yes' in row R4/column C3.

The RRC connection reconfiguration message is aimed at (among other purposes) establishing radio bearers to connect UE 120 to a target device. In particular, and as relevant to aspects of the present disclosure, the RRC connection reconfiguration message 604 encapsulates (i.e., contains in its payload) one or more measurement objects. The measurement objects include commands from eNodeB 140 to UE 120 to perform one or more measurements, and to transmit to eNodeB 140 the measurement results, when corresponding conditions are met and/or as the context requires.

As an example, a measurement object may correspond to a request for measurement of signal quality in a neighboring cell (with respect to the current serving cell of eNodeB 140) in the event the carrier signal quality in the current serving cell (of eNodeB 140) falls below a predetermined threshold. As another example, a measurement object may correspond to a request for measurement of a carrier signal in an adjacent cell (termed a secondary cell) to enable carrier aggregation. Alternatively, or in addition, the request may be for signal quality of carriers used by an access point (AP) in a nearby WLAN (Wireless Local Area Network) for LWA (LTE WiFi Carrier Aggregation). Such measurements requests may be aimed at enabling carrier aggregation to enable higher data throughput between UE 120 (on SIM2) and a corresponding device. Another example is a measurement object corresponding to a request for measurement of carrier signal quality in nearby cells to enable eNodeB 140 in determining which other cell to handover UE 120 to (when UE 120 is moving).

However, according to an aspect of the present disclosure, UE 120 does not respond to any measurement objects (which may, in general, be viewed as measurement requests) in the RRC reconfiguration message (604). That is, UE 120 may not perform any measurements (noted above), and does not transmit any results of the measurements to eNodeB 140 (even if such measurements are made). In particular, arbitration block 480 checks the corresponding entries (specifically R5/C2) of table 500 to determine if a VoLTE call is ongoing in SIM1. Since a VoLTE call is ongoing in SIM1, arbitration block instructs RRC 450B not to perform any measurements or to transmit any measurement results (noted in FIG. 6 as state 605), and does not allocate the transmit chain to SIM2. As a result, SIM2 does not perform any measurements or transmit any measurement results. Therefore, any disruption to the ongoing VoLTE call on SIM1 that might otherwise have happened (if the shared transmit chain is allocated to SIM2 to send measurement results) is avoided.

Figure 5D:
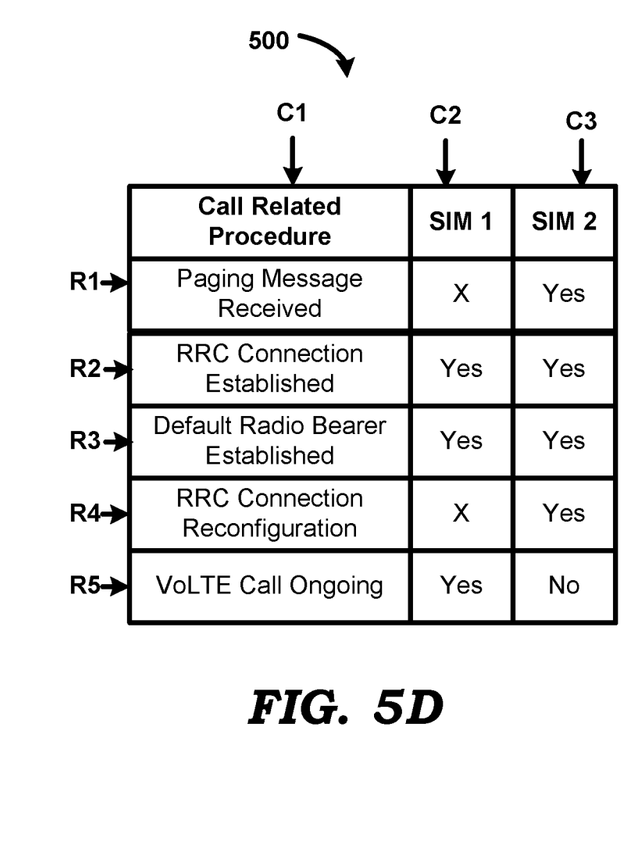

Between t6004 and t6005, a default bearer is reconfigured for SIP (Session Initiation Protocol) signaling (606). SIP protocol is described in detail in RFC 3261 published by the Internet Engineering Task Force (IETF). RRC 450B stores a state variable to reflect 'default radio bearer established' condition as 'Yes', and the status retrieved by arbitration block 480 and stored in table 500 (as shown in FIG. 5D) is accordingly indicated as 'Yes' in row R3/column C3.

At t6006, eNodeB 140 transmits a SIP: INVITE message (assuming the paging message 602 was in response to a request by another device for a VoLTE call with SIM2 of UE 120) or a SIP:MESSAGE (assuming the paging message 602 was in response to an SMS message waiting to be transmitted to SIM2 of UE 120), as indicated by message 607.

In interval t6007-t6008, IMS client (here SIM2 of UE 120) extracts the caller-ID of the originator of the VoLTE call intended for SIM2 from the SIP: INVITE message, assuming that the paging message (602) was for VoLTE call, as indicated in message 608. If the paging message 602 was for an SMS, SIM2 extracts the caller-ID of the originator of the SMS from the SIP: MESSAGE containing the text in the SMS over LTE.

At t6009, UE 120 transmits either a SIP: REJECT message (if the paging message 602 was for a VoLTE call) or a "200 OK" message (if the paging message 602 was for an SMS), as indicated by message 609.

Having thus extracted the caller-ID (which was a reason for responding to paging request 602), UE 120 transmits, at t6010, an RRC connection release message (610), and the RRC connection between UE 120 and eNodeB 140 is disconnected.

Thus, UE 120 is able to obtain the caller-ID of the originator of a VoLTE call or SMS without performing any measurements or transmitting the measurement results, and thereby without disrupting the ongoing VoLTE call on SIM1. UE 120 may operate similarly if there had been an ongoing VoLTE call on SIM2 when a measurement request is received on SIM1.

Thus, disruption of an ongoing call is prevented, as well as potential power savings (by not performing measurements or transmitting the measurement results) obtained by operating UE 120 in the manner noted above, when multiple SIMs share a same transmit chain. It is noted here that had UE 120 performed the measurements and transmitted the results, eNodeB 140 could potentially have responded with a WT (WLAN termination) Add request or SCell (secondary cell) Add request to enable carrier aggregation. Such ADD requests would have required UE 120 to transmit corresponding responses, and thereby further disrupt the ongoing VoLTE call on SIM1, with the possibility of the VoLTE call on SIM even being dropped. By not sending any measurement results at all, UE 120 prevents further requirement of use of the transmit chain for SIM2 when a VoLTE call is ongoing on SIM1.

If a VoLTE call had not been ongoing in SIM1, then arbitration block 480 would have responded to the measurement requests on SIM2 by making the measurements of carrier signals (of neighboring cells, other bands in the same cell (i.e., cell served by eNodeB 140), and/or APs of nearby WLANs. UE 120 would then have transmitted the measurement results (indicating the frequency bands, cells or APs that have acceptable signal quality) using the shared transmit chain, and responded to further requests such as adding a secondary cell, etc., to enable carrier aggregation (whereby SIM2 receives data units additionally (i.e., in parallel to those received via eNodeB 140) via the frequency bands/cell/APs indicated as having good carrier signal quality), and/or handover to a different cell served by the network operator corresponding to SIM2. Thus, if UE 120 is moving, and the measurement response by UE 120 indicates that a neighbor cell of the cell served by eNodeB 140 has acceptable signal quality, SIM2 may receive data from eNodeB 140 indicating that SIM2 has been handed over to such neighbor cell or base station.

6. Conclusion with Examples

References throughout this specification to "one aspect of the present disclosure", "an aspect of the present disclosure", or similar language means that a particular feature, structure, or characteristic described in connection with the aspect of the present disclosure is included in at least one aspect of the present disclosure. Thus, appearances of the phrases "in one aspect of the present disclosure", "in an aspect of the present disclosure" and similar language throughout this specification may, but do not necessarily, all refer to the same aspect of the present disclosure.

Thus Example 1 may correspond to a wireless device with two holders for housing respective SIMs. The wireless device may also contain a processing block for executing instructions which cause the wireless device to receive a first request on the second SIM to measure a signal quality at a location of the wireless device. The wireless device sends a response to the first request only if there is no call ongoing on the first SIM.

In example 2, the wireless device of example 1 can optionally maintain status data indicating whether any calls are ongoing in any of a set of SIMs provided on the wireless device, and the status data may be examined to determine whether any call is ongoing on the first SIM.

In example 3, the wireless device of any of examples 1 and 2 may contain a transceiver with a common transmission chain shared by both of the first SIM and the second SIM. In such an example, the second SIM receives a paging request to setup a second call, with the first request being received following the paging request. The wireless device communicates with the base station (from which both of the first request and the paging request are received) to extract a caller-ID of a calling station which caused the base station to send the paging request. The wireless device disconnects the second call soon after extracting the caller-ID.

In example 4, the wireless device of any of examples 1, 2 and 3, is assumed to be physically located in a location covered by a first cell of a first base station, and the response indicates a first set of frequency bands as having acceptable signal quality. The wireless device may thereafter receive additional data units using the first set of frequency bands. Such a feature may support carrier aggregation (for higher bandwidth) or switching to a different cell with stronger carrier signals at that location.

In example 5, the wireless device of any of examples 1, 2, 3 and 4, conducts a VoLTE call on SIM1 (as the ongoing call) and receives the paging request to transfer a SMS (short messaging service) on SIM2. The wireless device extracts the SMS from the calling station, with the caller-ID being contained in the SMS message.

The features of the above examples are also shown as implemented as respective methods, and also as a computer readable medium storing instructions which upon execution causes the above noted features to be operative.

While various aspects of the present disclosure have been described above, it should be understood that they have been presented by way of example only, and not limitation. Thus, the breadth and scope of the present disclosure should not be limited by any of the above-described aspects, but should be defined only in accordance with the following claims and their equivalents.

We claim:

1. A wireless device comprising:
   a first holder configured to house a first subscriber identity module (SIM);
   a second holder configured to house a second SIM; and
   one or more processors configured to
      receive, for the second SIM, a first request to measure signal quality at a location of the wireless device,
      check whether a call is ongoing for the first SIM, and send a response to the first request only if there is no call ongoing for the first SIM.

2. The wireless device of claim 1,
wherein the one or more processors are further configured to maintain status data indicating whether any calls are ongoing for any of a set of SIMs of the wireless device, and
wherein the one or more processors are configured to check whether the call is ongoing for the first SIM by examining the status data.

3. The wireless device of claim 2, further comprising:
a transceiver containing a transmission chain common to both of the first SIM and the second SIM,
wherein the one or more processors are further configured to
receive a paging request to setup a second call for the second SIM, the first request being received following the paging request, the first request and the paging request being received from a base station,
communicate with the base station to extract a caller-ID of a calling station which caused the base station to send the paging request, and
disconnect the second call after extracting the caller-ID of the calling station.

4. The wireless device of claim 3,
wherein the wireless device is at a location covered by a first cell of a first base station,
wherein the response indicates a first set of frequency bands as having signal quality that satisfies a criteria, and
wherein the one or more processors are further configured to receive additional data units based on the first set of frequency bands.

5. The wireless device of claim 3,
wherein the wireless device is at a location covered by a first cell of a first base station when the response is sent,
wherein the response indicates a first set of frequency bands of a second cell of a second base station as having signal quality that satisfies a criteria, and
wherein the one or more processors are further configured to receive data, from the first base station, indicating that service for the second SIM has been handed over to the second base station.

6. The wireless device of claim 3,
wherein the call is a voice over long term evolution (VoLTE) call,
wherein the paging request is configured to initiate a further VoLTE call, and
wherein the further VoLTE call is rejected after extracting the caller-ID of the calling station.

7. The wireless device of claim 3,
wherein the call is a voice over long term evolution (VoLTE) call,
wherein the paging request is configured to transfer a short messaging service (SMS) message to the wireless device, and
wherein the one or more processors are configured to communicate with the base station to extract the caller-ID of the calling station contained in the SMS message from the calling station.

8. A method performed in a wireless device, the method comprising:
receiving, for a second subscription, a first request to measure signal quality at a location of the wireless device;
checking whether a call is ongoing for a first subscription; and
sending a response to the first request only if there is no call ongoing for the first subscription.

9. The method of claim 8, further comprising:
maintaining status data indicating whether any calls are ongoing for any of a set of subscriptions of the wireless device,
wherein checking whether the call is ongoing for the first subscription comprises examining the status data.

10. The method of claim 9,
wherein both of the first subscription and the second subscription share a common transmission path in a transceiver of the wireless device, and
wherein the method further comprises:
receiving a paging request to setup a second call for the second subscription, the first request being received following the paging request, the first request and the paging request being received from a base station;
communicating with the base station to extract a caller-ID of a calling station which caused the base station to send the paging request; and
disconnecting the second call after extracting the caller-ID of the calling station.

11. The method of claim 10,
wherein the wireless device is at a location covered by a first cell of a first base station,
wherein the response indicates a first set of frequency bands as having signal quality that satisfies a criteria, and
wherein the method further comprises receiving additional data units based on the first set of frequency bands.

12. The method of claim 10,
wherein the wireless device is at a location covered by a first cell of a first base station when the response is sent,
wherein the response indicates a first set of frequency bands of a second cell of a second base station as having acceptable signal quality that satisfies a criteria, and
wherein the method further comprises receiving data, from the first base station, indicating that service for the second subscription has been handed over to the second base station.

13. The method of claim 10,
wherein the call is a voice over long term evolution (VoLTE) call,
wherein the paging request is configured to initiate a further VoLTE call, and
wherein the further VoLTE call is rejected after extracting the caller-ID of the calling station.

14. The method of claim 10,
wherein the call is a voice over long term evolution (VoLTE) call,
wherein the paging request is configured to transfer a short messaging service (SMS) message to the wireless device,
wherein communicating with the base station to extract the caller-ID of the calling station comprises communicating with the base station to extract the caller-ID of the calling station contained in the SMS message from the calling station.

15. A non-transitory machine-readable medium including one or more sequences of instructions for a wireless device having a first subscription and a second subscription, wherein execution of the one or more sequences of instructions by one or more processors of the wireless device enables the wireless device to perform:

receiving, for the second subscription, a first request to measure signal quality at a location of the wireless device;

checking whether a call is ongoing for the first subscription; and sending a response to the first request in response to determining there is no call ongoing for the first subscription.

16. The non-transitory machine-readable medium of claim 15, wherein execution of the one or more sequences of instructions by the one or more processors of the wireless device further enables the wireless device to perform:

maintaining status data indicating whether any calls are ongoing for any of a set of subscriptions of the wireless device, wherein checking whether the call is ongoing for the first subscription comprises examining the status data.

17. The non-transitory machine-readable medium of claim 16, wherein both of the first subscription and the second subscription share a common transmission path in a transceiver of the wireless device, and wherein execution of the one or more sequences of instructions by the one or more processors of the wireless device further enables the wireless device to perform:

receiving a paging request to setup a second call for the second subscription, the first request being received following the paging request, the first request and the paging request being received from a base station;

communicating with the base station to extract a caller-ID of a calling station which caused the base station to send the paging request; and disconnecting the second call after extracting the caller-ID of the calling station.

18. The non-transitory machine-readable medium of claim 17, wherein the wireless device is at a location covered by a first cell of a first base station, wherein the response indicates a first set of frequency bands as having signal quality that satisfies a criteria, and wherein execution of the one or more sequences of instructions by the one or more processors of the wireless device further enables the wireless device to perform:

receiving additional data units based on the first set of frequency bands.

19. The non-transitory machine-readable medium of claim 17, wherein the wireless device is at a location covered by a first cell of a first base station when the response is sent, wherein the response indicates a first set of frequency bands of a second cell of a second base station as having signal quality that satisfies a criteria, wherein execution of the one or more sequences of instructions by the one or more processors of the wireless device further enables the wireless device to perform:

receiving data, from the first base station, indicating that service for the second subscription has been handed over to the second base station.

20. The non-transitory machine-readable medium of claim 17, wherein the call is a voice over long term evolution (VoLTE) call, wherein the paging request is configured to initiate a further VoLTE call, and wherein the further VoLTE call is rejected after extracting the caller-ID of the calling station.

* * * * *